United States Patent

Nether

Patent Number: 6,068,344
Date of Patent: May 30, 2000

[54] WHEEL MOUNT

[76] Inventor: Joseph G. Nether, 433 Dairy Farm Rd., Lower Burrell, Pa. 15068

[21] Appl. No.: 08/918,306

[22] Filed: Aug. 26, 1997

Related U.S. Application Data

[60] Provisional application No. 60/025,088, Aug. 29, 1996.

[51] Int. Cl.[7] ............................................... B60B 1/00
[52] U.S. Cl. ......................................... 301/35.62; 411/546
[58] Field of Search ................................ 301/65, 35.62, 301/105.1, 64.7; 411/546, 383, 384, 185, 186

[56] References Cited

U.S. PATENT DOCUMENTS

| | | | |
|---|---|---|---|
| 1,384,150 | 7/1921 | Putnam | 301/35.62 |
| 1,467,824 | 9/1923 | Ahlers | 411/270 |
| 1,578,667 | 3/1926 | Kelsay | 411/338 |
| 1,875,930 | 9/1932 | Martin | 411/186 |
| 2,352,487 | 6/1944 | McNamara, Jr. | 301/35.62 |
| 2,700,172 | 1/1955 | Rohe | 16/2.1 |
| 2,730,906 | 1/1956 | Dickerson | 301/65 |
| 2,915,152 | 12/1959 | Graham | 403/228 |
| 2,957,196 | 10/1960 | Kreider et al. | 16/2.1 |
| 3,271,058 | 9/1966 | Anderson | 411/339 |
| 3,428,365 | 2/1969 | French | 301/65 |
| 3,649,079 | 3/1972 | English | 301/65 |
| 3,749,450 | 7/1973 | Senter et al. | 301/35.62 |
| 3,829,163 | 8/1974 | Hans . | |
| 3,960,047 | 6/1976 | Liffick | 301/35.62 |
| 4,708,397 | 11/1987 | Weinmann . | |
| 4,863,329 | 9/1989 | Wilson | 411/383 |
| 4,898,429 | 2/1990 | Plumer . | |
| 5,401,079 | 3/1995 | Rooney | 301/65 |
| 5,542,753 | 8/1996 | Plumer . | |
| 5,597,279 | 1/1997 | Thomas et al. | 411/432 |
| 5,711,581 | 1/1998 | Plumer | 301/65 |
| 5,785,391 | 7/1998 | Parry et al. | 301/35.62 |
| 5,855,462 | 1/1999 | Weiss | 411/383 |

FOREIGN PATENT DOCUMENTS

DOS 2 026 332  12/1970  Germany .

*Primary Examiner*—S. Joseph Morano
*Assistant Examiner*—Long Bao Nguyen
*Attorney, Agent, or Firm*—Jones, Tullar & Cooper, P.C.; Daniel A. Sullivan, Jr.

[57] ABSTRACT

A vehicle wheel mounting system utilizing flanged sleeves. There is a sleeve for each of the studs on the axle end. Each sleeve is slidably mounted on one of the studs and extends within one of the wheel mounting holes. The flanges bear against the portions of the surface of the web of the wheel surrounding the wheel mounting holes. Mounting nuts tighten on the stud ends against the flanges to complete the assembly.

27 Claims, 3 Drawing Sheets

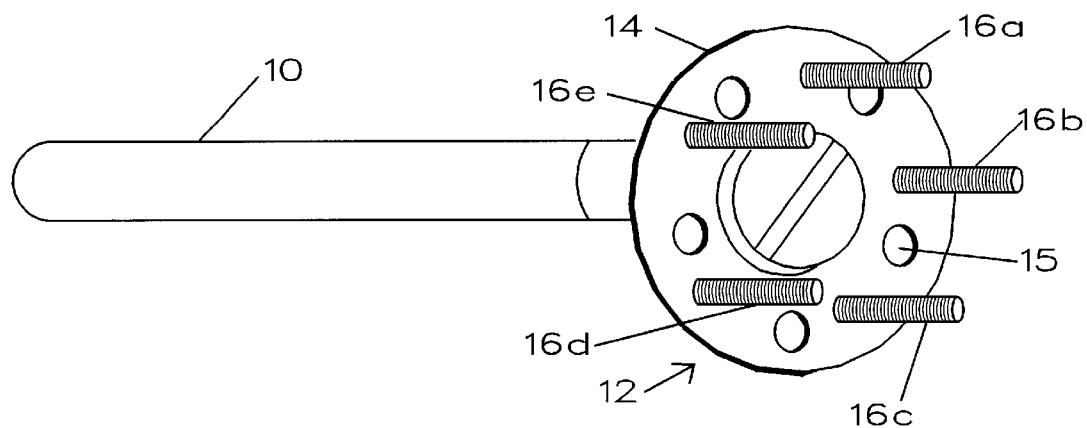
FIG. 1
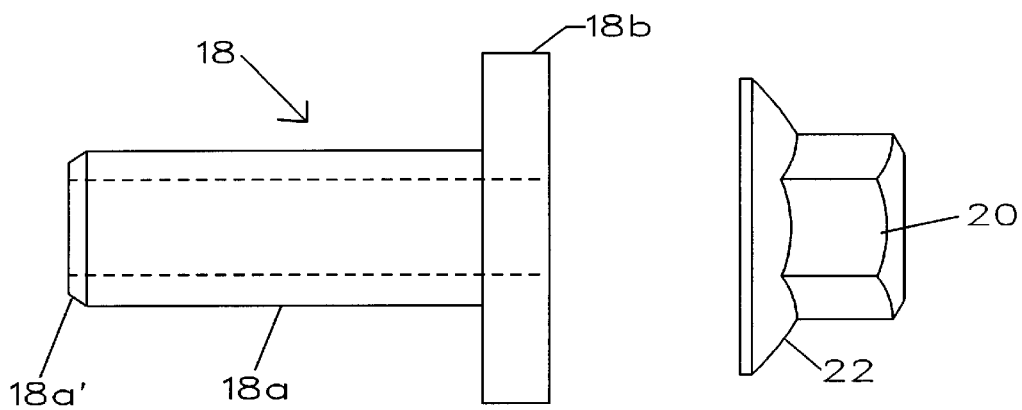
FIG. 2a    FIG. 2b
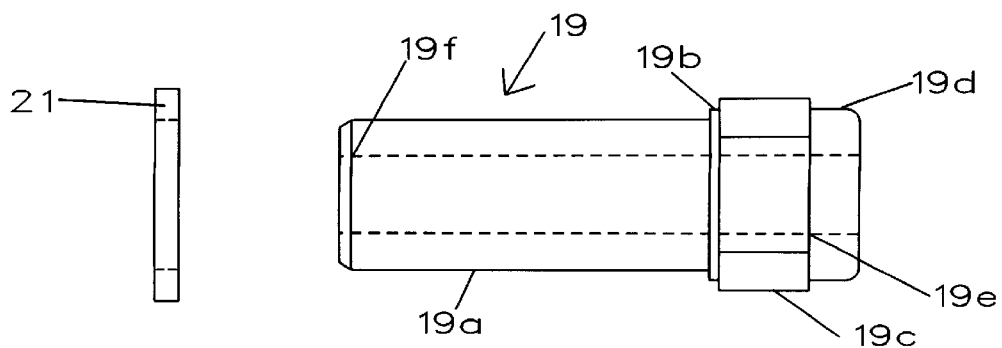
FIG. 3a
(PRIOR ART)
FIG. 3b
(PRIOR ART)

WHEEL MOUNT

CROSS-REFERENCE TO RELATED APPLICATION

The benefit of provisional application No. 60/025,088 filed Aug. 29, 1996 is claimed. Provisional application No. 60/025,088 filed Aug. 29, 1996 is incorporated here by reference.

TECHNICAL FIELD

The present invention relates to the mounting of wheels on axles, particularly the mounting of aluminum wheels.

BACKGROUND OF INVENTION

The typical automobile, as marketed in stock condition, comes with steel wheels. These wheels are attached to studs on the axle ends with lug nuts having tapered ends. As the lug nuts are tightened, the tapers act to align the wheel with respect to the studs and the axle.

Auto enthusiasts modify stock-condition automobiles, or other vehicles, by mounting "aftermarket" wheels. Aftermarket wheels are typically aluminum, or aluminum-containing composites, and will usually carry a wider rubber tire. These aftermarket wheels increase the performance of a vehicle.

It is also possible to order racing cars, for instance, directly from manufacturers, which cars have these aftermarket wheels already installed in the product as furnished by the manufacturer to the buyer.

Aftermarket wheels are mounted to an axle using hardware which differs from that used for the steel wheels of stock vehicles.

DISCLOSURE OF INVENTION

An object of the invention is to provide an improved mounting of aftermarket wheels on axles.

Other objects of the invention will become apparent from the remainder of this specification as set forth below.

Toward accomplishing one or more of these objects, the invention provides a new mounting hardware system utilizing flanged sleeves. There is a sleeve for each of the studs on the axle end. Each sleeve is slidably mounted on one of the studs and extends within one of the wheel mounting holes. The flanges bear against the portions of the surface of the web of the wheel surrounding the wheel mounting holes. Mounting nuts tighten on the stud ends against the flanges to complete the assembly.

BRIEF DESCRIPTION OF THE DRAWINGS

FIG. 1 is a perspective view of an axle shaft and axle end.

FIGS. 2a and 2b are side views of hardware elements of the invention.

FIGS. 3a and 3b are side views of prior art hardware elements.

MODES OF THE INVENTION

Figure 4:
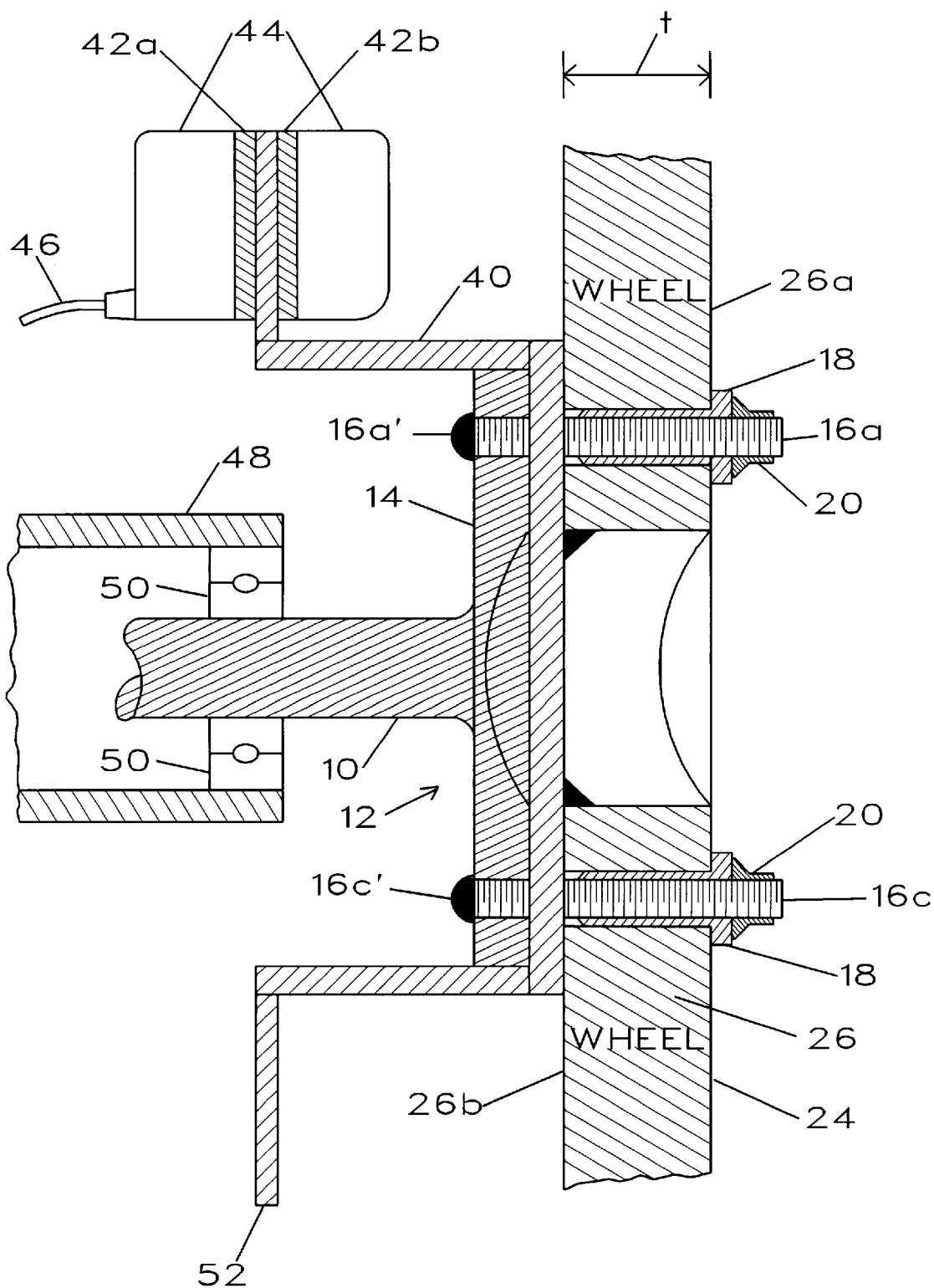
FIG. 4 is a cross sectional view showing elements of FIGS. 1 and 2 in assembly, with parts broken away.

Race cars and street machines ("Street machines" are high performance vehicles for street use, as opposed to racing track use.) are typically provided with light-metal wheels, such as aluminum wheels. These are the aftermarket wheels mentioned above. The central web-section of these wheels, being made of aluminum, or aluminum-faced composite material, is softer and thicker than is the case for stock steel wheels. The present invention is particularly suited for mounting these aluminum wheels.

With reference first to FIG. 1, this illustrates an axle shaft 10 and axle end 12 of a motor vehicle, such as a race car. The axle end plate 14 carries 5 wheel-mounting studs 16a–e, referred to collectively herein as wheel mounting studs 16. The studs are longer than is the case in the mounting of stock wheels, in order to accommodate the greater thickness of the central web section of aluminum wheels. A usual stud length for the mounting of aftermarket aluminum wheels is 3-inches. The axle end plate also contains an additional 5 holes 15, which may optionally be used to place the studs on a different standard circle.

FIG. 2a shows a flanged sleeve 18 of the invention. Flanged sleeve 18 may be provided in the form of machined, chrome-plated steel, or machined 6061 aluminum alloy in the T6 condition, or it may be made, for instance, by powder metallurgical methods. In general, five of these sleeves are used per wheel mounting, one for each stud. The invention is applicable, as well, in cases of wheel mounts using more than five studs.

The flanged sleeve has a sleeve portion 18a and a flange portion 18b on one end of the sleeve portion. The end of the sleeve opposite the flange exhibits a chamfer 18a'. The outer diameter of the flange portion 18b is significantly greater than the outer diameter, or trunk surface, of the sleeve portion 18a. The inner diameter, or bore, of the flanged sleeve 18 is smooth, rather than threaded. The bore is of constant size, that is, with uniform cross section throughout its length, thus cylindrical at its flange-near end, its flange-remote end, and in between. The bore is concentric with the sleeve portion.

Associated with the flanged sleeve is a mounting nut 20, as shown in FIG. 2b. A preferred nut is a Grade-8 (i.e., a hard, high quality nut), steel flange-nut, having an integral, flared shoulder 22.

FIGS. 3a and 3b show prior art wheel mounting hardware. Lug nut 19 has a shank portion 19a, a transitional ring portion 19b, a hexagonal portion 19c, and a tip portion 19d. The inner diameter of lug nut 19 is threaded from point 19e, aligned with the beginning of the hexagonal portion, to point 19f, aligned with the beginning of chamfer 19a'. Associated with lug nut 19 is washer 21, whose inner diameter has a sliding fit on shank portion 19a.

Lug nut 19 of FIGS. 3a and 3b is similar to the lug nuts used in U.S. Pat. No. 4,708,397 ('397), except that shank portion 19a serves alone to support the wheel, while in '397 an internally threaded sleeve serves for part of the support.

The mounting hardware of the present invention can be substituted for that of FIGS. 3a and 3b without any need to change stud length.

FIG. 4 is a cross sectional view showing axle end plate 14 and shaft 10 carrying a mounted aluminum wheel 24, whose central web 26 has a thickness t, which affects the lengths of the studs 16a–e and flanged sleeve 18. Thickness t may vary, depending on type of wheel. The web has an outer surface 26a and an inner surface 26b. The outer and inner surfaces of the web are perpendicular to the axes of the studs.

Only the central web and its immediate surroundings have been shown in FIG. 4, since the web is the portion of the wheel which is of interest for the present invention. The view shows two of the five studs, for instance studs 16a and 16c. The studs are threaded and have hexagonal bolt heads 16a' and 16c'. Each stud of the five studs is in assembly with a flanged sleeve 18 and mounting nut 20 for securing the wheel to the axle end plate.

Examples of wheels which may be mounted using the present invention are: the Drag Star, Superlite II, Street Lite, and Street Star wheels of the Cragar Co., Phoenix, Ariz., the Auto Drag, Convo Pro, and Pro Stock wheels of Center Line Performance Wheels Co., Sante Fe Springs, Calif., and the Draglite and Pro Star wheels of Weld Racing Co., Kansas City, Mo.

FIG. 4 shows other incidentally present equipment, such as brake hub 40, brake pads 42a,b, brake caliper 44, hydraulic brake line 46, axle housing 48, axle bearing 50, and brake rotor 52.

Figure 5:
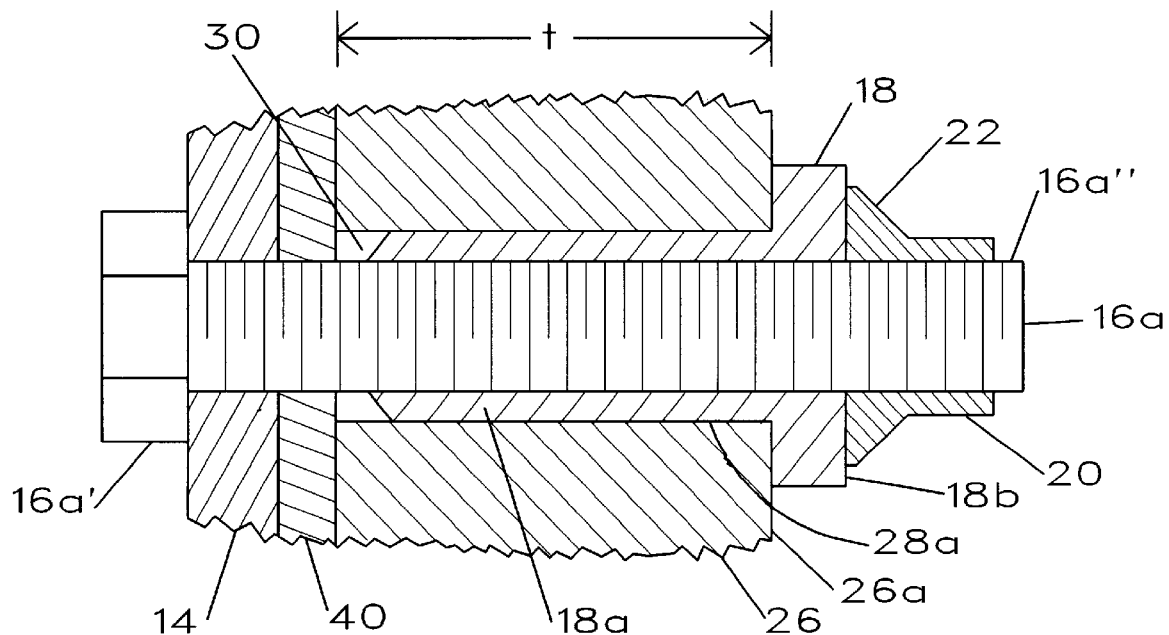
FIG. 5 is a detail view of a portion of FIG. 4.

FIG. 5 details a typical one of the five stud locations. Stud 16a is suitably secured in the axle end plate 14, or the brake hub 40, for example by threaded engagement achieved by turning of its bolt head 16a'. Stud 16a carries a flanged sleeve 18. The inner diameter of flanged sleeve 18 is chosen so that the sleeve fits snugly, e.g. has a locational clearance or sliding fit, on the stud. Flanged sleeve 18 in turn extends snugly, e.g. with a locational clearance or sliding fit, within a wheel mounting hole 28a, which is one of five wheel mounting holes (referred to collectively herein as wheel mounting holes 28) through web 26 at locations matching the locations of the five studs on the axle end plate. Thus, sleeve 18 has a snug fit with the stud and with the mounting hole. The terms "locational clearance" and "sliding fit" are defined in Table 12.2 on page 358 of ENGINEERNG GRAPHICS, 4th Ed., by F. Giesecke et al., Macmillan Publishing Co. 1987, and in ANSI Standard B4.2-1978, both incorporated here by reference. The flange portion 18b of the flanged sleeve extends free above surface 26a, so that the flanged sleeve can be grasped on the outer diameter of the flange portion for easy insertion into, and extraction out of, mounting hole 28a.

As indicated by the gap 30 in FIG. 5 between the end of flanged sleeve 18 and brake hub 40, the sleeve portion 18a of the flanged sleeve is slightly shorter than would be needed to pass completely through the mounting hole 28a, i.e. in this case slightly less than the thickness t of the wheel web 26. Shoulder 22 on nut 20 provides a distributed clamping force onto flange portion 18b, which in turn spreads the clamping force over the considerable contact area of flange portion 18b with the web 26. The contacting surfaces of nut 20 against flange portion 18b and flange portion 18b against wheel web 26 are perpendicular to the stud. Thus, the surfaces are flat, rather than conical. Because sleeve portion 18a measures slightly less than thickness t, tightening of the mounting nut brings the wheel web 26 to bear tightly against brake hub 40 and axle end plate 14. When the mounting nut 20 has been torqued tight, the stud protrudes out of the nut at stud tip 16a", as per rules of sanctioning bodies, i.e. NHRA (National Hot Rod Association), or IHRA (International Hot Rod Association).

As compared with the prior art mounting hardware of FIGS. 3a and 3b, flange portion 18b is thicker, and has a greater outer diameter, than washer 21 (FIG. 3a). For instance, flange portion may be ⅜-inch thick, as measured in the axial direction of the flanged sleeve, as compared to a washer thickness of less than ⅛-inch, while the outer diameter of the flange portion may measure 1¼-inch (one and one-quarter), as compared to 1 1/16-inch outer diameter for the washer. These larger dimensions of the flange portion of the flanged sleeve guards against distorting the wheel mounting hole 28 and against washer cupping, i.e. formation of an annular depression, in the wheel web area surrounding the wheel mounting hole, such as happens with the prior-art hardware involving use of washer 21. Along with cupping in the wheel web, ring portion 19b can plastically deform the washer 21 by pushing the inner edge portion 21a of the washer into the cupping, leading to a concave shape in the washer.

Use of the mounting system of the invention may be carried out as follows. Slide the wheel over the axle end such that the studs 16 go through the larger diameter wheel mounting holes 28. Then, slide a flanged sleeve 18 over each stud into the associated wheel mounting hole, until flange portion 18b contacts the surface of web 26. Chamfer 18a' facilitates entry of the flanged sleeves into the wheel mounting holes. Then, thread a mounting nut 20 onto each stud and tighten it against the flange of the flanged sleeve. Torque to specifications.

As compared to the prior art mounting hardware of FIGS. 3a, 3b, the hardware of FIGS. 2a, 2b has the advantage of many fewer rotations for tightening. Thus, lug nut 19 has to travel in threaded engagement essentially the entire stud length, whereas mounting nut 20 only needs to traverse the tip of the stud.

Further illustrative of the invention is the following example:

EXAMPLE 1

Figure 6:
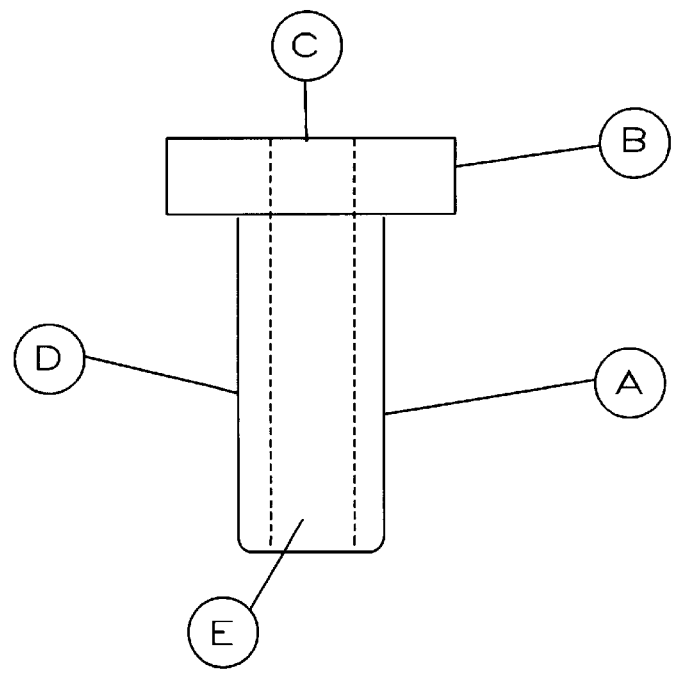
FIG. 6 is a view as in FIG. 2a, but rotated 90-degrees, in support of an example of the invention.

With reference to FIG. 6, in an example of the flanged sleeve of the invention, the following dimensions may be used:

| | |
|---|---|
| sleeve outer diameter A | 0.687-inch |
| flange axial thickness B | ⅜-inch |
| flange outer diameter C | 1 ¼-inches |
| sleeve axial length D | Various, depending on wheel thickness; examples of usual lengths are ½-, ¾-, and 1 ⅜-inches*. |
| inner diameter E | ½-inch or 7/16-inch |

These lengths are matched, respectively, with wheels of the same nominal web thickness. The webs are, in fact, somewhat (for example, about 1/16-inch) thicker than the nominal thickness.

There follows, now, the claims. It is to be understood that the above are merely preferred modes of carrying-out the invention and that various changes and alterations can be made without departing from the spirit and broader aspects of the invention as defined by the claims set forth below and by the range of equivalency allowed by law. For example, although the invention has been illustrated on the basis of a wheel having a central web of constant thickness around the mounting holes, the invention is, as well, useful for cases where the central web has a well at the location of each mounting hole, so that the lug nuts sit down in wells when tightened onto the studs.

What is claimed is:

1. Wheel mount hardware comprising a flanged sleeve having a bore dimensioned to slide on a wheel mounting stud of an axle, a sleeve portion dimensioned to extend through a mounting hole in a central web of a wheel between the wheel and the stud, to end at a gap (30), and to slide within the mounting hole, and a flange portion for bearing against a flat surface of the central web surrounding the mounting hole, the bore being dimensioned to have a snug fit with the stud, the sleeve portion being dimensioned to have a snug fit with the mounting hole.

2. Hardware as claimed in claim 1, further comprising a mounting nut threadable on the stud for clamping against the flange portion to assemble the wheel to the axle.

3. Hardware as claimed in claim 2, the mounting nut being a flange-nut.

4. Hardware as claimed in claim 2, configured such that, in assembly, the nut has surface contact with the flange portion in a plane perpendicular to the stud.

5. Hardware as claimed in claim 1, the bore being of constant size.

6. Wheel mount hardware comprising a flanged sleeve having a bore dimensioned to slide on a wheel mounting stud of an axle, a sleeve portion dimensioned to extend through a mounting hole in a central web of a wheel between the wheel and the stud, to end at a gap (30), and to slide within the mounting hole, and a flange portion for bearing against a surface of the central web surrounding the mounting hole and extending free above the surface, whereby the flanged sleeve can be grasped for insertion into, and extraction out of, the mounting hole, the bore being dimensioned to have a snug fit with the stud, the sleeve portion being dimensioned to have a snug fit with the mounting hole.

7. Hardware as claimed in claim 6, further comprising a mounting nut threadable on the stud for clamping against the flange portion to assemble the wheel to the axle.

8. Hardware as claimed in claim 7, the mounting nut being a flange-nut.

9. Hardware as claimed in claim 7, configured such that, in assembly, the nut has surface contact with the flange portion in a plane perpendicular to the stud.

10. Hardware as claimed in claim 6, the bore being of constant size.

11. A wheel assembly comprising an axle, a wheel mounting stud attached to the axle, a wheel having a central web pierced by a mounting hole, and a flanged sleeve having:

a bore slid on the stud of the axle, a sleeve portion slid within the mounting hole, the sleeve portion extending between the wheel and the stud and ending at a gap (30), and a flange portion bearing against a flat surface of the central web surrounding the mounting hole and extending free above the surface, whereby the flanged sleeve can be grasped for insertion into, and extraction out of, the mounting hole, the bore having a snug fit with the stud, the sleeve portion having a snug fit with the mounting hole.

12. An assembly as claimed in claim 11, further comprising a mounting nut threadable on stud and clamping against the flange portion to assemble the wheel to the axle.

13. An assembly as claimed in claim 12, the mounting nut being a flange-nut.

14. An assembly as claimed in claim 12, configured such that, in assembly, the nut has surface contact with the flange portion in a plane perpendicular to the stud.

15. An assembly as claimed in claim 11, the bore being of constant size.

16. A method of using hardware as claimed in claim 2, comprising the steps of sliding the wheel onto the stud such that the stud goes through the mounting hole, sliding the flanged sleeve onto the stud and into the mounting hole, until the flange portion contacts the surface of the web surrounding the mounting hole, threading the mounting nut onto the stud, and tightening the mounting nut against the flange portion.

17. A method of using hardware as claimed in claim 7, comprising the steps of sliding the wheel onto the stud such that the stud goes through the mounting hole, sliding the flanged sleeve onto the stud and into the mounting hole, until the flange portion contacts the surface of the web surrounding the mounting hole, threading the mounting nut onto the stud, and tightening the mounting nut against the flange portion.

18. Hardware as claimed in claim 1, the flange portion having a mounting nut contact surface which is flat.

19. Hardware as claimed in claim 6, the flange portion having a mounting nut contact surface which is flat.

20. An assembly as claimed in claim 11, the flange portion having a mounting nut contact surface which is flat.

21. Hardware as claimed in claim 1, the flanged sleeve being selected from the group consisting of machined and powder metallurgical products.

22. Hardware as claimed in claim 1, the bore being concentric with the sleeve portion.

23. Hardware as claimed in claim 6, the bore being concentric with the sleeve portion.

24. Hardware as claimed in claim 1, the stud being arranged on a standard circle relative to the axle.

25. Hardware as claimed in claim 6, the stud being arranged on a standard circle relative to the axle.

26. Hardware as claimed in claim 1, the sleeve portion dimensioned to extend through the mounting hole less than a thickness (t) of a web containing the mounting hole.

27. Hardware as claimed in claim 6, the sleeve portion dimensioned to extend through the mounting hole less than a thickness (t) of a web containing the mounting hole.

\* \* \* \* \*